Patented Feb. 2, 1937

2,069,670

UNITED STATES PATENT OFFICE 2,069,670

THIAZINE DYESTUFF AND PROCESS OF PREPARING IT

Walther Hoffmann, Frankfort-on-the-Main-Hochst, Germany, assignor to General Aniline Works, Inc., New York, N. Y., a corporation of Delaware No Drawing. Application June 28, 1935, Serial No. 28,977. In Germany July 19, 1934

2 Claims. (Cl. 260—27)

The present invention relates to a thiazine dyestuff which is free from zinc chloride and to a process of preparing it, particularly to a thiazine dyestuff which may be obtained by combining in known manner para-amino-dimethylaniline-thiosulfonic acid with mono-methyl-ortho-toluidine in the absence of zinc chloride, isolating in the absence of zinc chloride the dyestuff base which is nearly insoluble in water and transforming the dyestuff base by means of an acid into the dyestuff salt. The dyestuff thus obtained is distinguished by its high solubility in cold water, which is not attained, not even approximately, by any of the known thiazine dyestuffs. Since a solution of the new dyestuff does not form any deposit even on standing for a prolonged time, it is very suitable for producing hectograph inks. The new dyestuff surpasses the known representatives of its series, also by its capability of being copied. In particular it gives at the beginning of the copying operation copies which are much more intense in colour than is generally the case; which is very desirable in practice.

This technical effect, depending upon the extraordinarily high solubility of the dyestuff in cold water, could not be foreseen, as, for instance, the isomeride of the new dyestuff, the known thiazine, free from zinc chloride, obtained from para-amino-dimethylaniline-thiosulfonic acid and dimethylaniline, is comparatively sparingly soluble in cold water.

The new dyestuff has, presumably, the following constitution:

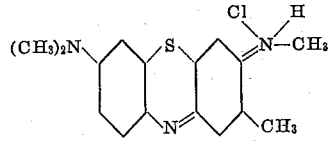

and is capable of forming a double salt with its acid hydrochloride.

The following example serves to illustrate the invention, but it is not intended to limit it thereto; the parts are by weight.

100 parts of para-amino-dimethylaniline thiosulfonic acid are suspended in 3500 parts of water. A solution of 49 parts of mono-methyl-ortho-toluidine in 180 parts of sulfuric acid of 20 per cent. strength is added. A solution of 79 parts of sodium bichromate in 230 parts of water is run into the mixture at about 15° C. in the course of 15 minutes, whereupon the temperature rises to about 22° C. The whole is stirred for half-an-hour; a solution of 39.5 parts of sodium bichromate in 115 parts of water is run in within 5 minutes and the whole is furthermore stirred for about three-quarters of an hour. 7 parts of copper sulfate are then added and the whole is heated to 90° C. within 15 to 20 minutes. The dyestuff is formed at about 85° C., the mass assuming a deep blue coloration. The temperature of 90° C. is maintained for some time and the chromium sludge is then separated from the hot solution. The dyestuff solution thus obtained is cooled to 40° C. and mixed with 38 parts of caustic soda solution of 40° Bé. The dyestuff base which is very sparingly soluble in water precipitates. It is filtered and washed free from caustic soda with the aid of water. The red-brown dyestuff base is then made into a paste with a small quantity of water. About 38 parts of hydrochloric acid of 20° Bé. are added to the paste until its reaction is weakly acid. A deep dark blue solution is obtained which is evaporated to dryness, the dyestuff separating in the form of a green mass which may easily be powdered. The hydrochloride thus obtained is distinguished by a very good solubility in cold water. The coloring power of the dyestuff is about 25 per cent greater than that of the isomeric dyestuff, free from zinc chloride, obtained from para-amino-dimethylaniline-thiosulfonic acid and dimethylaniline.

I claim:

1. The dyestuff of the following constitution:

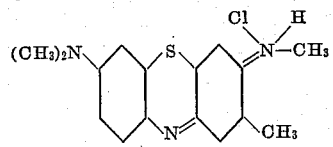

2. Process of preparng a thiazine dyestuff by oxidizing in present of water para-amino-dimethylaniline-thiosulfonic acid with mono-methyl-ortho-toluidine to the indamine-thiosulfonic acid, further oxidizing it in the absence of zinc chloride to the thiazine dyestuff, separating in the absence of zinc chloride the dyestuff in the form of its base which is nearly insoluble in water and transforming the dyestuff base into its hydrochloride.

WALTHER HOFFMANN.